United States Patent [19]

Rose et al.

[11] 4,263,627
[45] Apr. 21, 1981

[54] ELECTRONIC TACHOMETER

[75] Inventors: Andrew M. Rose, Mountain View, Calif.; James J. Touchton, Boulder, Colo.

[73] Assignee: Sperry Rand Corporation, New York, N.Y.

[21] Appl. No.: 49,247

[22] Filed: Jun. 18, 1979

[51] Int. Cl.³ .................... G11B 21/10; G11B 19/14; G11B 5/54
[52] U.S. Cl. .................... 360/75; 324/177; 318/561; 318/618; 318/632; 360/78
[58] Field of Search .................... 360/75, 78, 106; 318/618, 617, 594, 603, 561, 615, 326–328; 324/177, 173

[56] References Cited

U.S. PATENT DOCUMENTS

| 3,568,059 | 3/1971 | Sordello | 324/177 |
| 3,737,883 | 6/1973 | Sordello et al. | 318/576 |
| 3,820,712 | 6/1974 | Oswald | 324/160 |
| 3,883,894 | 5/1975 | Johnson | 360/78 |
| 4,006,394 | 2/1977 | Cuda et al. | 318/603 |
| 4,134,053 | 1/1979 | Klinger | 318/594 |
| 4,168,457 | 9/1979 | Rose | 360/78 |
| 4,184,108 | 1/1980 | Sordello et al. | 318/594 |

Primary Examiner—Alfred H. Eddleman
Attorney, Agent, or Firm—Thomas H. Olson; Eugene T. Battjer; William E. Cleaver

[57] ABSTRACT

An electronic tachometer that includes an integrator for producing a speed signal by integrating a signal representative of acceleration of a body and a differentiator for producing a speed signal by differentiating a signal representative of the position of the body, the differentiator being formed by a passive RC circuit and operatively associated with circuitry for alternately supplying to the differentiator two signals representative of position, one of which is inverted so that signals of a single polarity are supplied to the differentiator, and further circuitry for connecting the differentiator output to the integrator feedback circuitry so as periodically to update or reset the speed signal produced by the integrator, which is formed by an operational amplifier having a capacitive feedback which is shunted by a resistor when the differentiator output is active to update the integrator.

4 Claims, 2 Drawing Figures

ELECTRONIC TACHOMETER

BACKGROUND OF THE INVENTION

1. Field of the Invention

This invention relates to an electronic tachometer for producing a signal indicative of the speed at which a servo head traverses a series of magnetic tracks in data storage equipment, and more particularly to an improved differentiator for such tachometer that produces a highly accurate discontinuous speed signal in response to traversal of the magnetic tracks by the servo head.

2. Description of the Prior Art

Existent electronic tachometers for indicating the speed at which a servo head moves radially of a magnetic disk on which parallel concentric servo tracks are recorded are employed in many disk pack data storage systems. One known technique for producing such speed signal is to integrate the current signal applied to drive the servo head in the radial direction. Because the current is proportional to the acceleration of the servo head, integration of the current signal produces a signal representative of speed. Such signal, however, is subject to electronic integrator drift, external forces and force constant variation and therefore although continuous, is not sufficiently accurate.

Another known technique for producing a speed signal is to differentiate a signal representative of the position of the servo head relative to the tracks. This technique, although much more accurate than the integration technique, produces a discontinuous signal because the position signal, when the head moves at or near the center of one of the servo tracks, is not accurately related to head position.

The two techniques mentioned above have been combined to produce a tachometer that produces a continuous speed signal from an integrator which continuous signal is periodically reset or updated by a discontinuous speed signal produced by differentiating the position signal, U.S. Pat. No. 3,568,059 (324/177) to Sordello exemplifying such technique. Although the system disclosed in such patent provides improved performance over either of the above techniques when employed individually, present implementation utilizes an active differentiator that includes an operational amplifier. As is known, operational amplifiers have inherent characteristics such as amplifier slew rate, amplifier noise and band width limitations. Although these characteristics can be compensated for to avoid instability, they impair the accuracy of such system, particularly at low speeds wherein noise can account for a substantial proportion of the total output signal.

Further, the position signal includes alternate positive going and negative going portions, but portions of only one sense can be employed in producing a speed signal by differentiation. One known technique is to differentiate both the positive and negative going portions and then to rectify the resultant differentiated position signal so that all portions thereof vary in the same sense. Such rectification, however, increases the adverse effects of noise because the noise, rather than being averaged to zero by substantially equal positive and negative going portions is converted to DC by the rectifier. U.S. Pat. No. 3,883,894 (360/78) to Johnson exemplifies a system wherein the position signal is rectified.

Another technique, which eliminates the noise signal error resulting from rectification after differentiation is to provide two differentiators and to switch the differentiators so that the output of each differentiator is applied separately to the tachometer output during individual portions of the position signal. The accuracy of such system is dependent on the degree to which the components forming the differentiators are identical to one another. Identical components are impractical, particularly in commercially competitive systems. U.S. Pat. No. 3,820,712 (335/151.32) to Oswald exemplifies a system having two individual differentiators.

SUMMARY OF THE INVENTION

According to the present invention there is a single passive differentiator composed of a capacitor and a resistor. At the input is a switch which alternately switches between the regular position signal and the inverse of the position signal so that all signals supplied to the differentiator vary in one sense, i.e. either positive or negative. At the output of the differentiator is a second switch which is closed only when the input position signal is in the linear region; at all other times the output is grounded and the tachometer operates in an integrator mode. Consequently the output signal, although discontinuous, accurately represents the speed of the servo head when the switch is closed, and errors resulting from rectification are eliminated because rectification is not employed.

Also, because the system avoids the use of an operational amplifier in deriving the speed signal by differentiation, the above noted inaccuracies inherent in operational amplifiers are eliminated. Moreover, the frequency limiting characteristics of certain operational amplifiers do not impair the frequency response or band width of the tachometer constructed in accordance with the present invention, wherefore a tachometer embodying the invention is accurate at all speeds.

Also contributing to the accuracy of the speed signal produced by a tachometer embodying the present invention is the fact that a single differentiator is used thereby eliminating adverse effects present in systems employing two differentiators that arise from inevitable variations in component values.

An object of the present invention is to provide a differentiator having a sufficiently wide band width that accurate signals are produced at high servo head speeds. This object is achieved by differentiating the entire position signal with a wide band differentiator, including such noise as may be contained therein and relying on the band width limitations of the integrator to filter noise. Because the sources of error attributable to integration of motor current sense are very low frequency, band limiting of the differentiator output during the linear portion of the position signal by the integrator does not affect tachometer accuracy. In addition to the avoidance of band width limitations by elimination of an operational amplifier in the differentiator circuit, timing of operation of the switches at the input and the output of the differentiator is carefully controlled. The output switch is switched to ground immediately upon completion of differentiation of the linear portion of the position signal, thus avoiding application of inaccurate signals to the integrator. Simultaneous with operation of the output switch, the input switch is operated so as to apply to the differentiator the inverse of the previous portion of the signal. Thus the switching transients as well as the nonlinearities present near the peaks and valleys of the triangular speed signal are dissipated before the position signal again enters the linear region. Consequently, when the output switch is operated at the beginning of the next linear region, the differentiator is in a stable and accurate condition.

Another object of the present invention is to provide a tachometer which is accurate even at low speeds. This object is achieved, because by avoidance of rectification, the presence of a DC level from noise is avoided so that even at relatively low speeds there is not a significant noise component in the signal.

The foregoing together with other objects, features and advantages of the invention will be more apparent after referring to the following specification and the accompanying drawings.

DESCRIPTION OF A PREFERRED EMBODIMENT

Figure 1:
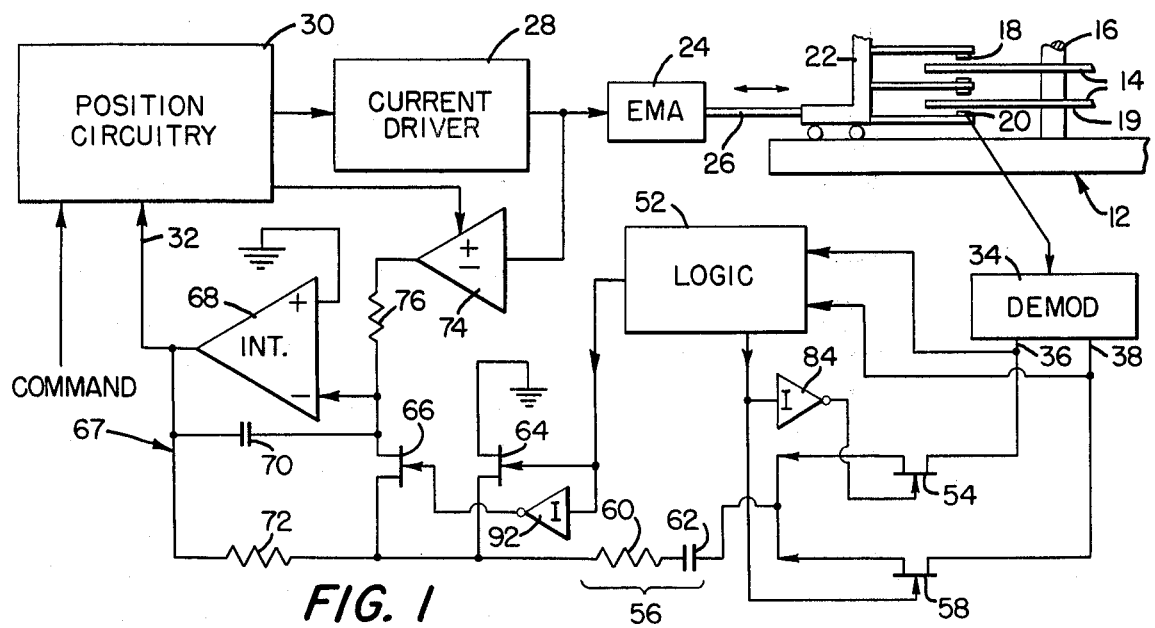
FIG. 1 is a schematic/block diagram of a tachometer according to the invention incorporated in a disk pack drive.

Referring more particularly to the drawings, reference numeral 12 indicates a disk pack storage system which includes a plurality of magnetic disks 14 which are supported on a motor-driven shaft 16. Associated with the data surfaces of the disks are data read write heads 18. One surface 19 of one of the disks is a servo surface; a servo head 20 coacts with the magnetic tracks recorded on servo surface 19 to provide signals from which information concerning the radial position of the heads can be derived. The heads are supported on a carriage 22 which is driven radially of shaft 16 by an electromagnetic actuator 24 which is linked to carriage 22 by a drive link 26. A current driver 28 supplies current to actuator 24. The magnitude of the current dictates the acceleration which the actuator undergoes and the polarity of the current dictates the direction in which the actuator moves carriage 22 and the magnetic heads carried thereby.

Conventional position circuitry 30 is provided for activating current driver 28 in accordance with externally generated command signals that indicate the track to which the magnetic heads 18 and 20 are to move. The position circuitry also receives a tachometer output or speed signal on a lead 32 which is employed to effect control of the magnitude of current produced by current driver 28 so as to control the speed at which carriage 22 is driven by electromagnetic actuator 24.

Figure 2:
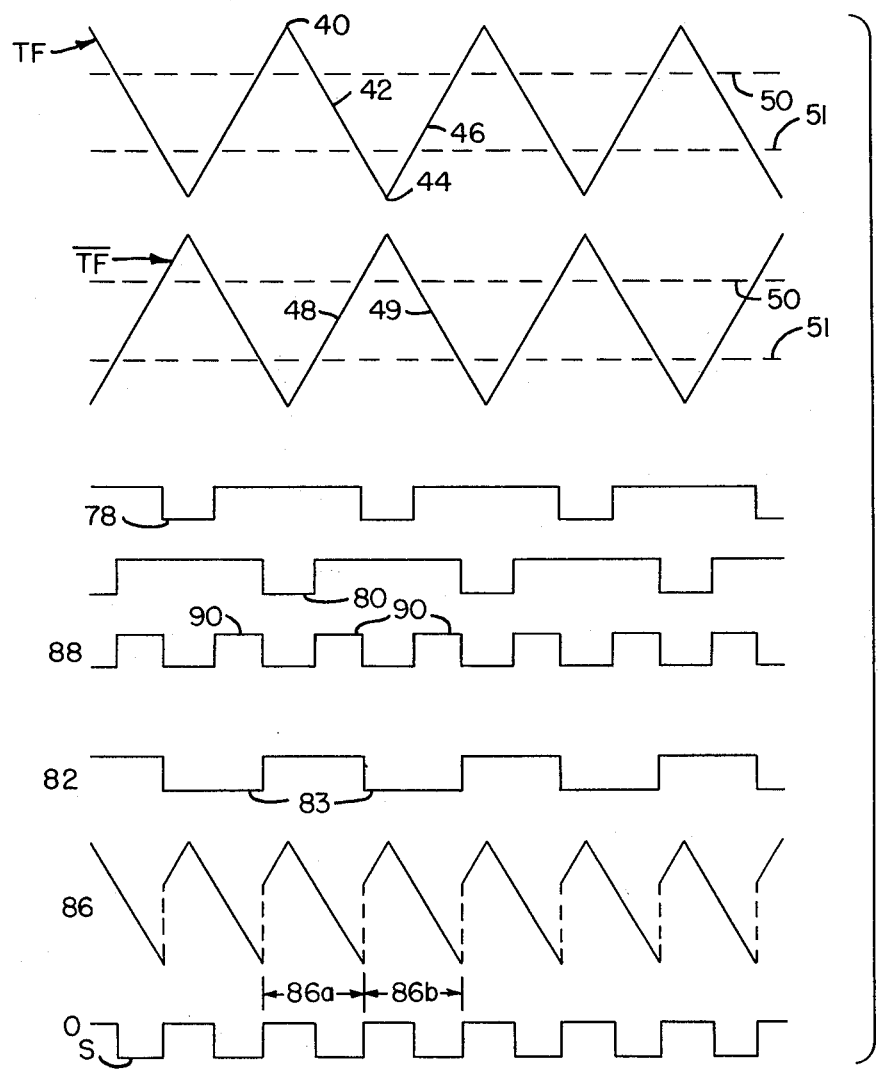
FIG. 2 is a plot of voltage level versus time at various points in the circuit of FIG. 1.

As servo head 20 traverses alternate positive and negative magnetic servo tracks on the disk surface 19, a signal is induced in the servo head 20. Such signal is fed to a demodulator 34. The demodulator produces two track following signals: TF on an output lead 36, and $\overline{TF}$ on an output lead 38. Signal $\overline{TF}$, as can be seen in FIG. 2, is the inverse of signal TF.

Signal TF includes a positive peak 40 which occurs when servo head 20 is aligned with the center of a positive servo track on the disk surface 19. As the servo head moves to a point midway between a positive and negative servo track, signal TF changes in a negative going sense and crosses a midpoint 42. The signal TF continues in a negative going sense at a rate representative of the radial speed of the servo head until it is aligned with the center of a negative servo track and produces a null 44. Signal TF then changes in a positive going sense through another midpoint 46 and to another positive peak. Signal $\overline{TF}$ varies in a sense opposite to that in which signal TF varies. Thus, at a midpoint 48, which is concurrent with midpoint 42, signal $\overline{TF}$ varies in a positive going sense, and at a midpoint 49, which is concurrent with midpoint 46, signal $\overline{TF}$ varies in a negative going sense. The portions of signals TF and $\overline{TF}$ between broken lines 50 and 51 are linear; between such broken lines the rates of change of the magnitudes of signals TF and $\overline{TF}$ are linearly representative of the radial speed of the heads with respect to the magnetic tracks. Differentiation of the linear portions produces a signal representative of speed. Above broken line 50 and below broken line 51, however, the signals are nonlinear and therefore not useful for deriving a signal that is accurately representative of speed.

Signals TF and $\overline{TF}$ form the inputs to a logic circuit 52. The specific details of a suitable logic circuit are disclosed in U.S. Pat. No. 3,820,712, the disclosure of which is incorporated hereinto by this reference. The logic circuit produces properly timed control signals; its construction and operation will be described in more detail hereinafter.

Signal TF is also connected via output lead 36 through a FET (field effect transistor) 54 to the input of a differentiator 56. Signal $\overline{TF}$ is connected via output lead 38 through an FET 58 to the input of the differentiator. The gate terminals of FETs 54 and 58 are driven by logic circuit 52 so that the signals TF and $\overline{TF}$ will be alternately connected to the input of the differentiator in order that signals of only one sense are supplied to the differentiator. Differentiator 56 is formed by a resistor 60 and a capacitor 62. Consequently, the left-hand terminal of capacitor 62 will provide a voltage level S (see FIG. 2) that has a magnitude representative of radial speed of the read write heads 18 and the servo head 20 during the linear portions of signals TF and $\overline{TF}$.

A FET 64 is provided for grounding the output of the differentiator during times when differentiator output is nonlinear and therefore non-representative of head speed. There is another FET 66 which connects the output of the differentiator to an integrator 67 when the differentiator output is in the linear range. FETs 64 and 66 are controlled by logic circuit 52 such that FET 64 grounds the differentiator output when signals TF and $\overline{TF}$ are nonlinear and FET 66 connects the differentiator output to integrator 67 when signals TF and $\overline{TF}$ are linear. Integrator 67 includes an operational amplifier 68 and a feedback circuit composed of a capacitor 70 and a parallel resistor 72. When FET 66 is open (in the high resistance state) the output of the differentiator formed by resistor 60 and capacitor 62 is not connected to the integrator inputs; when FET 66 is in the closed (low resistance) state the differentiator is connected to the integrator so as to update the integrator.

As is known the signal produced by current driver 28 is proportional to acceleration of heads 18 and 20. Such signal is fed through a polarity switch 74 and an input resistor 76 to the integrator input. Because operational amplifier 68 has a capacitive feedback formed by capacitor 70, the output of the integrator is the integral of the input signal which output is proportional to speed since it is proportional to the integral of acceleration. The output of the integrator is connected via lead 32 to position circuitry 30 so that an appropriate control signal can be delivered to the current driver 28.

Logic circuit 52 switches FETs 54 and 58 so that signals of only one sense (i.e., positive or negative) are delivered to the differentiator. For achieving such mode of control, logic circuit 52 includes a comparator (not shown) which produces a set signal 78 when signal $\overline{TF}$ is above a prescribed level 50 at which signal $\overline{TF}$ is no longer in a linear range. Logic circuit 52 includes a second comparator (not shown) which produces a clear signal 80 when signal TF exceeds an equivalent level 50. Set signal 78 and clear signal 80 constitute the inputs to a latch (not shown) which produces an output signal 82 that is in an active state 83 commencing when signal $\overline{TF}$ exceeds the linear range and terminating when signal TF exceeds the linear range. Latch output signal 82 is in an inactive state at all other times. Latch output signal 82 is directly connected to FET 58 and is connected through an inverter 84 to FET 54. Consequently, FET 54 is conductive during the period of active state 83 of latch output signal 82 and FET 58 is in a high resistance state during such period. At all other times, FET 54 is in a high resistance state and FET 58 is in a conductive state. A signal 86 is thus applied to the input of differentiator 56. As can be seen from the graphical representation of signal 86 in FIG. 2, the linear portions of the signal all vary in a negative going sense.

As can be seen from the depiction of signal 86 in FIG. 2, the signal includes nonlinear portions of signals TF and $\overline{TF}$ as well as linear portions. In order to apply the derivative of only the linear portions, logic circuit 52 is adapted to control FETs 64 and 66 such that FET 64 is conductive during the nonlinear portions of signal 86, thereby to connect the differentiator output to ground, and FET 66 is conductive during the time that signal 86 is linear so as to connect the differentiator output to the input of the integrator and to couple resistor 72 into the integrator feedback. To achieve this mode of operation logic circuit 52 generates an AND function of set signal 78 and clear signal 80. Such AND function is a signal 88 (see FIG. 2) which has active portions 90 that correspond in timing and duration with the linear portions of track following signals TF and $\overline{TF}$. Signal 88 is directly connected to FET 64 so that the FET is conductive during periods other than the occurrence of active states 90. The control signal is connected through an inverter 92 to FET 66 so that the latter FET is conductive during active states 90, i.e. during the time when the track following signals are in their linear ranges. Thus the output of the differentiator supplied to the integrator will have a magnitude S representative of the radial speed of the servo heads toward and away from shaft 16 during the linear portions of the track following signals and will be at ground potential during all other times. As seen in the lower curve of FIG. 2, the differentiator output S is a discontinuous negative signal. The negative differentiator output S is connected to the negative input terminal of operational amplifier 68 so that the continuous tachometer output thereof is positive.

The operation of the present invention can be appreciated by assuming that carriage 22 is stationary and that read/write heads 18 and servo head 20 are at a particular radial location with respect to shaft 16. When access to data stored at some different radial location is desired a command signal is applied to position circuitry 30, the command signal including address information as to the specific radial location that is to be accessed. In order to reach the new radial position in the shortest possible time it is conventional to accelerate carriage 22 and the magnetic heads carried thereby during a first portion of the travel and to decelerate the carriage during a second portion of the travel. Control circuit 30 includes facilities for controlling current driver 28 to achieve this, the tachometer of the present invention providing speed information to enable the position circuitry to perform the desired mode of operation.

Because the current supplied by current driver 28 to electromagnetic actuator 24 is proportional to the acceleration of carriage 22, the integral of such current as derived by integrator 67 produces a signal representative of speed. The polarity of such signal will be established by control of polarity switch 74 so that the speed signal produced by the integrator will indicate speed irrespective of the direction of movement of the carriage.

As is known in the art the speed signal produced by integrator 67 is subject to electronic DC drift, motor current sense reporting error, force constant error and external forces such as windage. This inaccurate, although continuous, speed signal is periodically reset or updated by the differentiator of the invention. The linear portions of position signals TF and $\overline{TF}$ have a slope that very accurately represents velocity. The track following signals are fed through FETs 54 and 58 and are also fed to logic circuit 52 for generation of timing signals as has been described above and in U.S. Pat. No. 3,820,712. The portion of signal TF designated at 86a in FIG. 2 is supplied to differentiator circuit 56 in response to FET 54 being turned on. Next FET 54 is turned off and FET 58 is turned on so as to connect the portion of track follower signal $\overline{TF}$ indicated at 86b. Such alternate operation of FETs 54 and 58 assures that signals of only one sense are supplied to differentiator 56.

Only the linear portions of the derivative of signal 86 are accurately representative of speed. The output switch formed by FETs 64 and 66 assures that only the linear portion is connected to integrator 67. Having reference to FIG. 2, the portion of signal 86 that occurs concurrently with signal 88 being in the low or inactive state is not connected to the integrator but is connected to ground through FET 64. When signal 88 switches to an active state 90, however, logic circuit 52 switches FET 64 to a high resistance state and switches FET 66 to a low resistance state so that the linear portion of the derivative of signal 86, i.e. the level S, is connected to the input of the integrator to update or reset the same to an accurate value truly indicative of speed.

The advantage of the relative timing between operation of FETs 54 and 58 on the one hand and FETs 64 and 66 on the other hand can be appreciated by reference to curve 86 in FIG. 2. Immediately after FETs 54 and 58 are switched, signal 86 is non-linear. The derivative of such nonlinear signal is not connected to the integrator; it is connected to ground through FET 64. After the signal 86 reaches a positive peak, it goes in a negative sense. When signal 86 reaches the linear region the output of differentiator 56 is accurately representative of speed. At such time signal 88 switches to active state 90 whereupon FET 66 is switched to a conductive state so that accurate speed signal is connected to the integrator. Any adverse effect of transients within the differentiator are dissipated before the differentiator is connected to the integrator in response to occurrence of active state 90 so that the signal connected to the integrator is a highly accurate representation of speed.

The relative values of differentiator resistor 60, differentiator capacitor 62, feedback capacitor 70 and feedback resistor 72 are important. Resistor 60 must be small enough to fully charge capacitor 62 before signal 88 becomes active to connect the differentiator output to the integrator, yet large enough to limit the charging current through FETs 54 and 58 to a safe level and not to load demodulator circuit 34.

It will thus be seen that the present invention provides an improved differentiator circuit for an electronic tachometer wherein a single passive RC circuit is employed to differentiate both parts of the signal so that consistent results are obtained. Moreover, because the differentiator avoids the use of an operational amplifier, it avoids the inaccuracies inherent in such device. Finally the circuit produces a signal that is accurately representative of speed for all speeds because it is neither sensitive to noise, which introduces inaccuracies at low speeds, nor does it have any frequency limiting noise filtering circuitry which limits response at high speeds.

Although one embodiment of the invention has been shown and described it will be obvious that other adaptations and modifications can be made without departing from the true spirit and scope of the invention.

What is claimed is:

1. An electronic tachometer for producing at a circuit point a voltage signal representative of the speed at which a servo head moves transversely of a plurality of parallel magnetic tracks formed on a magnetizable medium, the head coacting with the magnetic tracks to produce a regular discontinuous position signal, said regular discontinuous position signal having a first linear portion that varies in a positive-going sense at a rate representative of servo head speed transversely of the magnetic tracks, a second linear portion that varies in a negative-going sense at a rate representative of servo head speed transversely of the magnetic tracks, and nonlinear portions intermediate said linear portions, said tachometer comprising means for producing an inverted signal that is the inverse of said regular signal, a passive differentiator for differentiating said regular and inverted signals, said differentiator having an input and an output which is the derivative of the input, means for alternately coupling said regular and inverted discontinuous signals to said input so that signals of only one sense are coupled to said differentiator, and switch means connecting the output to the circuit point only at times when said signals are in said linear portions.

2. An electronic tachometer in accordance with claim 1 wherein said switch means includes means for grounding said differentiator output during said nonlinear portions of said signals.

3. An electronic tachometer according to claim 2 in combination with an integrator that includes an operational amplifier having a first signal input connected to said point and a second signal input, means for coupling to said second signal input a signal representative of the transverse acceleration of said servo head, said operational amplifier having an output and a feedback circuit connecting said output and said first signal input, said feedback circuit including a capacitor and a resistor in parallel with said capacitor, so that the output of said operational amplifier produces a continuous signal representative of servo head transverse speed.

4. An improved circuit for resetting an integrator in an electronic tachometer wherein the integrator produces a continuous speed signal by integrating an acceleration signal that is representative of the acceleration of a servo head transversely of a plurality of substantially parallel magnetic tracks formed on a magnetizable medium, and wherein the servo head coacts with the magnetic tracks to produce a regular discontinuous position signal which has a first linear portion that varies in a positive-going sense at a rate representative of servo head speed transversely of the magnetic tracks, a second linear portion that varies in a negative-going sense at a rate representative of servo head speed transversely of the magnetic tracks, and nonlinear portions intermediate said linear portions, the improved resetting circuit comprising means for producing an inverted signal that is the inverse of said regular signal, a passive differentiator for differentiating said regular and inverted signals, said differentiator having an input and an output which is the derivative of the input, means for alternately coupling said regular and inverted discontinuous signals to said input so that signals of only one sense are coupled to said differentiator, and switch means connecting the output to the integrator only at times when said signals are in said linear portions.

* * * * *